(12) United States Patent
Tanaka et al.

(10) Patent No.: US 6,210,765 B1
(45) Date of Patent: *Apr. 3, 2001

(54) ADHESIVE POLYETHYLENE COMPOSITIONS AND MULTI-LAYER LAMINATED FILMS USING THE SAME

(75) Inventors: Haruhiko Tanaka; Hideshi Kawachi; Masahiro Inaba; Yuji Sawada, all of Ichihara (JP)

(73) Assignee: Mitsui Petrochemical Industrie Ltd, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/780,775

(22) Filed: Jan. 9, 1997

(30) Foreign Application Priority Data

Jan. 11, 1996 (JP) .................................... 8-003388

(51) Int. Cl.[7] .............................. B32B 27/32; B32B 27/34
(52) U.S. Cl. ...................... 428/35.2; 428/35.4; 428/34.9; 428/476.1; 428/476.9; 428/516; 525/74
(58) Field of Search ................. 428/516, 35.2, 428/35.4, 34.9, 476.1, 476.9; 525/74

(56) References Cited

U.S. PATENT DOCUMENTS

| | | | |
|---|---|---|---|
| 4,481,262 | * 11/1984 | Shida et al. | 428/516 |
| 4,572,854 | * 2/1986 | Dallmann et al. | 428/516 |
| 5,300,354 | * 4/1994 | Harita et al. | 428/516 |
| 5,482,770 | * 1/1996 | Bekele | 428/516 |
| 5,744,250 | * 4/1998 | Lee et al. | 428/516 |
| 5,902,655 | * 6/1999 | Matsuoka et al. | 428/516 |
| 5,914,164 | * 6/1999 | Ciocca et al. | 428/36.7 |

FOREIGN PATENT DOCUMENTS

| | | | |
|---|---|---|---|
| 495996 | * 7/1992 | (EP) | . |
| 0507557 | 10/1992 | (EP) | . |
| 0509750 | 10/1992 | (EP) | . |
| 0434386 | 6/1994 | (EP) | . |
| 57-165413 | 10/1982 | (JP) | . |
| 57-165469 | 10/1982 | (JP) | . |
| WO96/30455 | 10/1996 | (WO) | . |

\* cited by examiner

Primary Examiner—Donald R. Wilson

(57) ABSTRACT

Disclosed is a specific adhesive polyethylene composition comprising [1] a modified ethylene/α-olefin copolymer resin or elastomer obtained by modifying a specific ethylene/α-olefin copolymer resin or elastomer, each of which comprises ethylene and an α-olefin of 3 to 20 carbon atoms, with an unsaturated carboxylic acid or anhydride, ester, amide, imide or metallic salt derivative of a unsaturated carboxylic acid thereof, [2] an unmodified ethylene/α-olefin copolymer resin and/or an unmodified ethylene/α-olefin copolymer elastomer and [3] a tackifier. Also disclosed is a multi-layer laminated film of 3 or more layers in which a layer of the above composition is interposed between an ethylene polymer layer and either a polyamide resin layer, an ethylene/vinyl alcohol copolymer layer or a layer of a mixture of polyamide resin and ethylene/vinyl alcohol copolymer. The adhesive polyethylene composition shows excellent adhesion strength to ethylene polymers, polyamide resins and ethylene/vinyl alcohol copolymers, high heat-sealing strength and heat resistance. The multi-layer laminated film shows excellent strength, heat resistance and gas barrier properties, and besides this film has heat shrinkability, so that the film is suitably used as a shrink film.

13 Claims, No Drawings

ADHESIVE POLYETHYLENE COMPOSITIONS AND MULTI-LAYER LAMINATED FILMS USING THE SAME

FIELD OF THE INVENTION

The present invention relates to adhesive polyethylene compositions and multi-layer laminated films using the compositions. More particularly, the invention relates to adhesive polyethylene compositions which are suitably used for bonding an ethylene polymer layer and a layer of a polyamide resin and/or an ethylene/vinyl alcohol copolymer, and the invention also relates to multi-layer laminated films using the compositions for adhesive layers.

BACKGROUND OF THE INVENTION

Laminated films of ethylene polymers and polyamide resins and laminated films of ethylene polymers and ethylene/vinyl alcohol copolymers have been conventionally known. Also, a variety of adhesive layer-forming materials used for producing the laminated films have been proposed. For example, Japanese Patent Laid-Open Publication No. 165413/1982 discloses that a modified polyethylene obtained by reacting a linear low-density polyethylene with an unsaturated carboxylic acid or derivative thereof and a modified polyethylene composition obtained by blending the modified polyethylene with a synthetic rubber and/or a linear low-density polyethylene are employable as the adhesive layer-forming materials. Japanese Patent Laid-Open Publication No. 165469/1982 discloses an adhesive resin composition obtained by modifying a mixture of a linear low-density polyethylene and a synthetic rubber with an unsaturated carboxylic acid or derivative thereof.

However, the adhesive layer-forming materials conventionally proposed have problems. For example, if the materials are subjected to stretching operation when preparing shrink films, the interlaminar strength between the ethylene polymer layer and the polyamide resin layer or the ethylene/vinyl alcohol copolymer layer may be sharply decreased, so that the resulting laminated films do not always exhibit satisfactory adhesion strength.

The shrink films are used, for example, for ham packaging various materials using an automatic packaging machine. In packaging, the film ends are heat sealed, and in the subsequent heat shrinking stage, a stress is applied to the heat sealed portions. Therefore, the shrink films are required to have high heat-sealing strength.

Moreover, in the case of food packaging, the shrink films are generally subjected to boiling sterilization treatments at temperatures as high as not lower than 80° C. after the packaging, so that the shrink films are required to have resistance to high temperatures of not lower than 80° C.

Accordingly, an adhesive polyethylene composition showing excellent adhesion strength to ethylene polymers, polyamide resins and ethylene/vinyl alcohol copolymers, high heat-sealing strength and heat resistance is desired. Also desired is a multi-layer laminated film wherein an adhesive layer of the composition is interposed between an ethylene polymer layer and a layer of a polyamide resin and/or an ethylene/vinyl alcohol copolymer.

OBJECT OF THE INVENTION

An object of the present invention is to provide an adhesive polyethylene composition showing excellent adhesion strength to ethylene polymers, polyamide resins and ethylene/vinyl alcohol copolymers and high heat-sealing strength, and heat resistance.

Another object of the invention is to provide a multi-layer laminated film wherein an adhesive layer of the adhesive polyethylene composition is interposed between an ethylene polymer layer and a layer of a polyamide resin and/or an ethylene/vinyl alcohol copolymer.

A further object of the invention is to provide a multi-layer laminated film having an adhesive layer of the above-mentioned adhesive polyethylene composition showing excellent adhesion strength in any of the unstretched and stretched states.

SUMMARY OF THE INVENTION

An adhesive polyethylene composition according to the invention is a composition comprising:

[I] a modified ethylene/α-olefin copolymer resin [A2] or a modified ethylene/α-olefin copolymer elastomer [B2] obtained by modifying an unmodified ethylene/α-olefin copolymer resin [A1] or an unmodified ethylene/α-olefin copolymer elastomer [B1], respectively, with an unsaturated carboxylic acid or derivative thereof and having a graft quantity of 0.01 to 5% by weight, each of said resin [A1] and elastomer [B1] being a copolymer of ethylene and an α-olefin of 3 to 20 carbon atoms and having the following properties:

(i) the density is in the range of 0.860 to 0.930 g/cm$^3$; and (ii) the crystallinity, as measured by X-ray diffractometry, is not more than 60%;

[II] an unmodified ethylene/α-olefin copolymer resin [C1] and/or an unmodified ethylene/α-olefin copolymer elastomer [C2]; and

[III] a tackifier (D), wherein the composition has the following properties:

(a) the content of the tackifier [D] is in the range of 0.1 to 20% by weight based on 100% by weight of the whole composition;

(b) the graft quantity of the unsaturated carboxylic acid or derivative thereof is in the range of 0.01 to 1.0% by weight based on 100% by weight of the whole composition;

(c) the density is in the range of 0.880 to 0.920 g/cm$^3$;

(d) the crystallinity, as measured by X-ray diffractometry, is in the range of 15 to 50%; and (e) the melt flow rate (ASTM D 1238, 190° C., load of 2.16 kg) is in the range of 0.1 to 50 g/10 min.

The adhesive polyethylene composition of the invention is suitable as an adhesive resin composition for shrink films.

A multi-layer laminated film according to the invention is a laminate of 3 or more layers comprising an ethylene polymer layer [I] comprising an ethylene polymer having an ethylene content of not less than 70% by mol, an adhesive layer [II] comprising the adhesive polyethylene composition of the invention, and either of a polyamide resin layer [III], an ethylene/vinyl alcohol copolymer layer [IV] or a layer [V] of a mixture of a polyamide resin and an ethylene/vinyl alcohol copolymer, superposed in this order.

The ethylene polymer is preferably a low-density polyethylene or an ethylene/vinyl acetate copolymer.

DETAILED DESCRIPTION OF THE INVENTION

The adhesive polyethylene composition and the multi-layer laminated film using the composition according to the invention are described in detail hereinafter.

Adhesive Polyethylene Composition

First, the adhesive polyethylene composition of the invention is described.

The adhesive polyethylene composition of the invention comprises a modified ethylene/α-olefin copolymer resin [A2] or a modified ethylene/α-olefin copolymer elastomer [B2] obtained by grafting a specific ethylene/α-olefin copolymer resin [A1] or a specific ethylene/α-olefin copolymer elastomer [B1] with an unsaturated carboxylic acid or derivative thereof, and further comprises an unmodified ethylene/α-olefin copolymer resin [C1] and/or an unmodified ethylene/α-olefin copolymer elastomer [C2], and a tackifier [D].

Unmodified Ethylene/α-olefin Copolymer Resin [A1], [C1]

The unmodified ethylene/α-olefin copolymer resin [A1] used in the invention comprises ethylene and an α-olefin of 3 to 20 carbon atoms.

The ethylene content in the ethylene/α-olefin copolymer resin [A1] is not less than 70% by mol, preferably 75 to 95% by mol.

Examples of the α-olefins include propylene, 1-butene, 1-pentene, 1-hexene, 4-methyl-1-pentene, 1-octene and 1-decene. Of these, preferably used are propylene, 1-butene, 1-hexene, 4-methyl-1-pentene and 1-octene. These α-olefins can be used singly or in combination of two or more kinds.

The ethylene/α-olefin copolymer resin [A1] has a density of 0.860 to 0.930 g/cm$^3$, preferably more than 0.900 g/cm$^3$ and not more than 0.930 g/cm$^3$, more preferably 0.905 to 0.925 g/cm$^3$.

The temperature (melting point, Tm) giving the maximum peak of an endotherm curve of the ethylene/α-olefin copolymer resin [A1] measured by a differential scanning calorimeter (DSC) is not higher than 125° C., preferably 100° C. to 125° C.

The ethylene/α-olefin copolymer resin [A1] has a crystallinity, as measured by X-ray diffractometry, of not more than 60%, preferably 20 to 50%, more preferably 30 to 45%.

The ethylene/α-olefin copolymer resin [A1] has a melt flow rate (MFR, ASTM D 1238, 190° C., load of 2.16 kg) of usually 0.01 to 100 g/10 min, preferably 0.1 to 50 g/10 min, more preferably 0.2 to 20 g/10 min.

The unmodified ethylene/α-olefin copolymer resin [C1] preferably used in the invention is an ethylene/α-olefin copolymer resin [C1] which is a copolymer of ethylene and an α-olefin of 3 to 20 carbon atoms and has the following properties:

(i) the density is more than 0.900 g/cm$^3$ and not more than 0.930 g/cm$^3$, (ii) the temperature (melting point, Tm) giving the maximum peak of an endotherm curve of said copolymer resin measured by a differential scanning calorimeter (DSC) is not higher than 125° C., preferably 100 to 125° C., and (iii) the crystallinity, as measured by X-ray diffractometry, is not more than 60%.

The ethylene/α-olefin copolymer resin [C1] may be the same as or different from the ethylene/α-olefin copolymer resin [A1].

The ethylene/α-olefin copolymer resin [A1] or [C1] having the above properties may be prepared by known processes using catalysts of titanium (Ti) type or zirconium (Zr) type.

Unmodified Ethylene/α-olefin Copolymer Elastomer [B1], [C2]

The unmodified ethylene/α-olefin copolymer elastomers [B1] and [C2] are each a copolymer of ethylene and an α-olefin of 3 to 20 carbon atoms and have a density of usually 0.860 to 0.930 g/cm$^3$, preferably 0.860 to 0.900 g/cm$^3$, more preferably 0.860 to 0.895 g/cm$^3$, particularly preferably 0.860 to 0.890 g/cm$^3$, and a melt flow rate (MFR, ASTM D 1238, 190° C., load of 2.16 kg) of usually 0.01 to 200 g/10 min, preferably 0.01 to 100 g/10 min, more preferably 0.05 to 50 g/10 min.

The ethylene/α-olefin copolymer elastomers [B1] and [C2] desirably have a crystallinity, as measured by X-ray diffractometry, of less than 30%, or desirably is amorphous.

Examples of the α-olefins of 3 to 20 carbon atoms include, for example, propylene, 1-butene, 1-pentene, 1-hexene, 4-methyl-1-pentene, 1-octene, 1-decene and mixtures thereof. Of these, α-olefins of 3 to 10 carbon atoms are particularly preferable.

The ethylene/α-olefin copolymer elastomers [B1] and [C2] used in the invention may have constituent units other than those derived from α-olefins, such as constituent units derived from diene compounds, as far as the properties of the elastomer are maintained.

Examples the constituent units which may be contained in the ethylene/α-olefin copolymer elastomers [B1] and [C2] include:

those derived from linear nonconjugated dienes such as 1,4-hexadiene, 1,6-octadiene, 2-methyl-1,5-hexadiene, 6-methyl-1,5-heptadiene and 7-methyl-1,6-octadiene;

those derived from cyclic nonconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, 6-chloromethyl-5-isopropenyl-2-norbornene; and those derived from diene compounds such as 2,3-diisopropylidene-5-norbornene, 2-ethylidene-3-isopropylidene-5-norbornene and 2-propenyl-2,2-norbornadiene.

These dienes can be used singly or in combination. The constituent units derived from the dienes are contained in amounts of usually not more than 10% by mol, preferably 0 to 5% by mol.

The ethylene/α-olefin copolymer elastomers [B1] and [C2] may be the same as or different from each other.

The ethylene/α-olefin copolymer elastomer [B1] and [C2] may be prepared by known processes using catalysts of Ti type, vanadium (V) type or Zr type.

Modified Ethylene/α-olefin Copolymer Resin [A2]

The modified ethylene/α-olefin copolymer resin [A2] used in the invention is obtained by grafting the unmodified ethylene/α-olefin copolymer resin [A1] with an unsaturated carboxylic acid or derivative thereof.

In the modified ethylene/α-olefin copolymer resin [A2] used in the invention, the graft quantity of the unsaturated carboxylic acid or derivative thereof is in the range of 0.01 to 5% by weight, preferably 0.1 to 3% by weight, based on 100% by weight of the modified ethylene/α-olefin copolymer resin [A2].

Examples of the unsaturated carboxylic acids to graft the unmodified ethylene/α-olefin copolymer resin [A1] with include acrylic acid, methacrylic acid, maleic acid, fumaric acid and itaconic acid. Examples of the derivatives of unsaturated carboxylic acids include anhydrides, esters, amides, imides and metallic salts of unsaturated carboxylic acids. Particular examples include maleic anhydride, endic anhydride (Himic™ anhydride), itaconic anhydride, citraconic anhydride, methyl acrylate, methyl methacrylate, ethyl acrylate, ethyl methacrylate, glycidyl acrylate, monoethyl maleate, diethyl maleate, monomethyl fumarate, dimethyl fumarate, monomethyl itaconate, diethyl itaconate, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide, fumaric acid-N,N-dibutylamide, maleimide, N-butylmaleimide, N-phenylmaleimide, sodium acrylate, sodium methacrylate, potassium acrylate and potassium methacrylate. Of the graft monomers, most preferably used are maleic anhydride and Himic™ anhydride.

The graft modification of the ethylene/α-olefin copolymer resin [A1] with the unsaturated carboxylic acids or derivatives thereof (graft monomers) may be carried out by various conventional methods.

For example, there are a melt modification method in which the ethylene/α-olefin copolymer resin [A1] is melted by an extruder and a graft monomer is added to the resulting motel resin to perform graft copolymerization, and a solution modification method in which the ethylene/α-olefin copolymer resin [A1] is dissolved in a solvent and a graft monomer is added to the resulting solution to perform graft copolymerization. Of these, the melt modification method using an extruder is preferable. In each method, it is preferable to initiate the reaction in the presence of a radical initiator so as to efficiently copolymerize the graft monomer.

Examples of such radical initiators include organic peroxides and organic peresters. More specifically, there can be mentioned:

organic peroxides, such as benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene and lauroyl peroxide;

organic peresters, such as tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate and tert-butyl perdiethylacetate; and azo compounds, such as azoisobutyronitrile and dimethyl azoisobutyrate.

Of these, preferable are dialkyl peroxides, such as dicumyl peroxide, di-tert-butyl peroxide, 2,5-dimethyl-2,5-di(peroxybenzoate)hexyne-3, 2,5-dimethyl-2,5-di(tert-butylperoxy)hexane and 1,4-bis(tert-butylperoxyisopropyl) benzene.

The radical initiator is used in an amount of usually 0.001 to 1 part by weight based on 100 parts by weight of the ethylene/α-olefin copolymer resin [A1].

The graft reaction may be conducted in the presence of other monomers such as styrene.

The quantity of the unsaturated carboxylic acid or derivative thereof to graft the ethylene/α-olefin copolymer resin [A1] with (referred to as "graft quantity") is in the range of 0.01 to 5% by weight based on 100% by weight of the modified ethylene/α-olefin copolymer resin [A2].

Modified Ethylene/α-olefin Copolymer Elastomer [B2]

The modified ethylene/α-olefin copolymer elastomer [B2] used in the invention is obtained by grafting the unmodified ethylene/α-olefin copolymer elastomer [B1] with an unsaturated carboxylic acid or derivative thereof.

The modified ethylene/α-olefin copolymer elastomer [B2] preferably used in the invention is an ethylene/α-olefin copolymer elastomer which is obtained by modifying an ethylene/α-olefin copolymer elastomer with an unsaturated carboxylic acid or derivative thereof and has a graft quantity of 0.01 to 5% by weight, said elastomer being a copolymer of ethylene and an α-olefin of 3 to 20 carbon atoms and having the following properties:

(i) the density is in the range of 0.860 to 0.900 g/cm$^3$, and (ii) the crystallinity, as measured by X-ray diffractometry, is less than 30%.

For graft modification of the ethylene/α-olefin copolymer elastomer [B1], the same unsaturated carboxylic acids or derivatives thereof as used for preparing the ethylene/α-olefin copolymer resin [A2] are employable. Further, the same graft modification methods as described for preparing the ethylene/α-olefin copolymer resin [A2] may be used to graft the ethylene/α-olefin copolymer elastomer [B1].

Tackifier [D]

The tackifier [D] used in the invention is a solid amorphous polymer, and is generally used in various tackifier for fields such as fields of adhesive tapes, paints and hot melt adhesives. As the tackifiers, the below-described various resins, which are classified based on the difference in the kinds of the starting monomers to be polymerized, are employable:

aliphatic hydrocarbon resins prepared by using, as main starting materials, a $C_4$ fraction and a $C_5$ fraction obtained by cracking petroleum, naphtha or the like, mixtures thereof, and such as isoprene and 1,3-pentadiene in an optional fraction in the $C_5$ fraction;

aromatic hydrocarbon resins prepared by using, as main starting materials, styrene derivatives and indenes in a $C_9$ fraction obtained by cracking petroleum, naphtha or the like;

aliphatic/aromatic copolymerization hydrocarbon resins prepared by copolymerizing an optional fraction of a $C_4$ fraction and a $C_5$ fraction with a $C_9$ fraction;

alicyclic hydrocarbon resins prepared by hydrogenating aromatic hydrocarbon resins;

synthetic terpene hydrocarbon resins having structures containing aliphatic, alicyclic and aromatic hydrocarbon resins;

terpene hydrocarbon resins prepared by using, as starting materials, α,β-pinenes in turpentine oil;

coumarone-indene hydrocarbon resins prepared by using, as starting materials, indenes and styrenes in coal tar naphtha;

low-molecular weight styrene resins; and rosin hydrocarbon resins.

Of these tackifiers (D), the aliphatic hydrocarbon resins and the alicyclic hydrocarbon resins prepared by hydrogenating aromatic hydrocarbon resins are preferable, because they have good dispersibility in the modified ethylene/α-olefin copolymer resin [A2] or the modified ethylene/α-olefin copolymer elastomer [B2] and the unmodified ethylene/α-olefin copolymer resin [C1] or the elastomer [C2]. Among them, more preferable are alicyclic hydrocarbon resins having a softening point (measured by a ring and ball method) of 105 to 150° C., preferably 110 to 140° C., and having a hydrogenation degree of aromatic groups of not less than 80%, preferably not less than 85%.

Adhesive Polyethylene Composition

The adhesive polyethylene composition of the invention has a density of 0.880 to 0.920 g/cm$^3$, preferably 0.900 to 0.920 g/cm$^3$. The density is determined in the following manner. Strands obtained in the measurement of melt flow rate (MFR) at 190° C. under a load of 2.16 kg are treated by heating at 120° C. for 1 hour and slowly cooled to room temperature over a period of 1 hour, to thereby measure the density thereby with a gradient density tube.

The crystallinity of the composition, as measured by X-ray diffractometry, is in the range of 15 to 50%, preferably 30 to 45%.

In the composition, the graft quantity of the unsaturated carboxylic acid or derivative thereof is in the range of 0.01 to 1.0% by weight, preferably 0.1 to 0.8% by weight, based on 100% by weight of the whole composition.

The composition has a melt flow rate (ASTM D 1238, 190° C., load of 2.16 kg) of 6.1 to 50 g/10 min, preferably 0.2 to 10 g/10 min, more preferably 0.5 to 5 g/10 min.

The proportions of the components in the adhesive polyethylene composition of the invention are as follows.

(1) When the adhesive polyethylene composition consists of the modified ethylene/α-olefin copolymer resin [A2], the unmodified ethylene/α-olefin copolymer resin [C1] and the tackifier [D], the modified ethylene/α-olefin copolymer resin [A2] and the unmodified ethylene/α-olefin copolymer resin [C1] are contained in the composition in a ratio ([A2]/[C1], by weight) of 10/90 to 70/30, preferably 20/80 to 60/40.

(2) When the adhesive polyethylene composition consists of the modified ethylene/α-olefin copolymer resin [A2], the unmodified ethylene/α-olefin copolymer elastomer [C2] and the tackifier [D], the modified ethylene/α-olefin copolymer resin [A2] and the unmodified ethylene/α-olefin copolymer elastomer [C2] are contained in the composition in a ratio ([A2]/[C2], by weight) of 95/5 to 5/95, preferably 90/10 to 10/90, particularly preferably 80/20 to 20/80.

(3) When the adhesive polyethylene composition consists of the modified ethylene/α-olefin copolymer resin [A2], the unmodified ethylene/α-olefin copolymer resin [C1], the unmodified ethylene/α-olefin copolymer elastomer [C2] and the tackifier [D], the modified ethylene/α-olefin copolymer resin [A2], the unmodified ethylene/α-olefin copolymer resin [C1] and the unmodified ethylene/α-olefin copolymer elastomer [C2] are contained in the composition in a ratio ([A2]+[C1]/[C2], by weight) of 95/5 to 5/95, preferably 90/10 to 10/90, particularly preferably 80/20 to 20/80, and the ratio ([A2]/[C1], by weight) of the modified ethylene/α-olefin copolymer resin [A2] to the unmodified ethylene/α-olefin copolymer resin [C1] is in the range of 10/90 to 70/30, preferably 20/80 to 60/40.

(4) When the adhesive polyethylene composition consists of the modified ethylene/α-olefin copolymer elastomer [B2], the unmodified ethylene/α-olefin copolymer resin [C1] and the tackifier [D], the modified ethylene/α-olefin copolymer elastomer [B2] and the unmodified ethylene/α-olefin copolymer resin [C1] are contained in the composition in a ratio ([B2]/[C1], by weight) of 5/95 to 95/5, preferably 90/10 to 10/90, particularly preferably 80/20 to 20/80.

(5) When the adhesive polyethylene composition consists of the modified ethylene/α-olefin copolymer elastomer [B2], the unmodified ethylene/α-olefin copolymer resin [C1], the unmodified ethylene/α-olefin copolymer elastomer [C2] and the tackifier [D], the modified ethylene/α-olefin copolymer elastomer [B2], the unmodified ethylene/α-olefin copolymer elastomer [C2] and the unmodified ethylene/α-olefin copolymer resin [C1] are contained in the composition in a ratio ([B2]+[C2]/[C1], by weight) of 95/5 to 5/95, preferably 90/10 to 10/90, more preferably 80/20 to 20/80, particularly preferably 75/25 to 50/50, and the ratio ([B2]/[C2], by weight) of the modified ethylene/α-olefin copolymer elastomer [B2] to the unmodified ethylene/α-olefin copolymer elastomer [C2] is in the range of 100/0 to 30/70, preferably 100/0 to 40/60.

In the compositions (1) to (5), the tackifier [D] is used in an amount of 0.5 to 30% by weight, preferably 1 to 20% by weight, particularly preferably 2 to 15% by weight, based on 100% by weight of the whole composition.

Of the above adhesive polyethylene compositions, the polyethylene composition consisting of the modified ethylene/α-olefin copolymer elastomer [B2], the unmodified ethylene/α-olefin copolymer resin [C1] and the tackifier [D] is preferable, because it exhibits the highest adhesion. In this polyethylene composition, the modified ethylene/α-olefin copolymer elastomer [B2] is contained in an amount of 5 to 95% by weight, preferably 10 to 50% by weight, more preferably 20 to 40% by weight, based on 100% by weight of the whole composition.

Preparation of Adhesive Polyethylene Composition

The adhesive polyethylene composition of the invention may be prepared by conventional methods, for example, by mixing the above components by mixing apparatuses such as Henschel mixer, twin-cylinder mixer, ribbon blender and tumbling blender, or by melt kneading the resulting mixture by various kneading apparatuses such as single-screw extruder, twin-screw extruder, kneader and Banbury mixer to thereby granulate or pulverize the resulting resin.

To the composition of the invention, various additives which are conventionally added to polyolefins, such as heat stabilizer, weathering stabilizer, antistatic agent, nucleating agent, pigment and dye, other polyolefins, saponification products of ethylene/α-olefin copolymers, polyester resins, polyamide resins, waxes, etc. may be added within limits not prejudicial to the objects of the invention.

The adhesive polyethylene composition of the invention comprising the above components exhibits high adhesion strength to ethylene polymers, polyamide resins and ethylene/vinyl alcohol copolymers.

Multi-layer Laminated Film

The multi-layer laminated film of the invention is described below.

The multi-layer laminated film of the invention is a laminate of 3 or more layers comprising an ethylene polymer layer [I] comprising an ethylene polymer, an adhesive layer [II] comprising the adhesive polyethylene composition of the invention, and either a polyamide resin layer [III], an ethylene/vinyl alcohol copolymer layer [IV] or a layer [V] of a mixture of a polyamide resin and an ethylene/vinyl alcohol copolymer, superposed in this order.

The ethylene polymer has an ethylene content of not less than 70% by mol, preferably 70 to 100% by mol, more preferably 80 to 100% by mol.

Examples of such ethylene polymers include high-density polyethylene, linear low-density polyethylene, high-pressure low-density polyethylene, ethylene/vinyl acetate copolymer (EVA), ethylene/ethyl acrylate copolymer, ethylene/acrylic acid copolymer and ionomer resins. Of these, use is made of low-density polyethylene and EVA, particularly preferably linear low-density polyethylene and EVA each having a density of not more than 0.930 g/cm$^3$.

Examples of the polyamide resins preferably used include nylon 6, nylon 66, nylon 610, nylon 12, nylon 11, MXD nylon, amorphous nylon and a terephthalic acid/adipic acid/hexamethylenediamine copolymer.

For the ethylene/vinyl alcohol copolymer, a copolymer having an ethylene content of 20 to 50% by mol is preferably employed.

Such ethylene/vinyl alcohol copolymer may be prepared by saponifying a copolymer of ethylene and vinyl acetate.

Some embodiments of the multi-layer laminated film of the invention are given below.

(1) A three-layer laminated film of the ethylene polymer layer [I]/the adhesive layer [II]/the polyamide resin layer [III]

(2) A three-layer laminated film of the ethylene polymer layer [I]/the adhesive layer [II]/the ethylene/vinyl alcohol copolymer layer [IV]

(3) A three-layer laminated film of the ethylene polymer layer [I]/the adhesive layer [II]/the layer [V] of a mixture of polyamide resin and ethylene/vinyl alcohol copolymer (4) A four-layer laminated film of the ethylene polymer layer [I]/the adhesive layer [II]/the polyamide resin layer [III]/the ethylene/vinyl alcohol copolymer layer [IV]

(5) A four-layer laminated film of the ethylene polymer layer [I]/the adhesive layer [II]/the ethylene/vinyl alcohol copolymer layer [IV]/the polyamide resin layer [III]

(6) A four-layer laminated film of the ethylene polymer layer [I]/the adhesive layer [II]/the layer [V] of a mixture of polyamide resin and ethylene/vinyl alcohol copolymer/the polyamide resin layer [III]

(7) A four-layer laminated film of the ethylene polymer layer [I]/the adhesive layer [II]/the layer [V] of a mixture of polyamide resin and ethylene/vinyl alcohol copolymer/the ethylene/vinyl alcohol copolymer layer [IV]

(8) A five-layer laminated film of the ethylene polymer layer [I]/the adhesive layer [II]/the polyamide resin layer [III]/the adhesive layer [II]/the ethylene polymer layer [I]

(9) A five-layer laminated film of the ethylene polymer layer [I]/the adhesive layer [II]/the ethylene/vinyl alcohol copolymer layer [IV]/the adhesive layer [II]/the ethylene polymer layer [I]

(10) A five-layer laminated film of the ethylene polymer layer [I]/the adhesive layer [II]/the layer [V] of a mixture of polyamide resin and ethylene/vinyl alcohol copolymer/the adhesive layer [II]/the ethylene polymer layer [I]

(11) A four-layer laminated film of the ethylene polymer layer [I]/the adhesive layer [II]/the ethylene/vinyl alcohol copolymer layer [IV]/the adhesive layer [II]

(12) A four-layer laminated film of the ethylene polymer layer [I]/the adhesive layer [II]/the polyamide resin layer [III]/the adhesive layer [II]

The multi-layer laminated film of the invention, for example, a three-layer laminated film, may be prepared by laminating an ethylene polymer layer, an adhesive layer and a layer of polyamide resin and/or ethylene/vinyl alcohol copolymer in a molten state.

The multi-layer laminated film may be prepared by various methods, e.g., co-extrusion, film cast molding, inflation (film blowing), and tenter or tubular biaxial orientation.

When the multi-layer laminated film of the invention is prepared by cast molding using T-die, the molding rate is desirably made high, e.g., not less than 20 m/min, preferably 20 to 150 m/min, whereby the resulting film has high adhesion strength.

After molding, the multi-layer laminated film of the invention may be left as it is, i.e., in the unstretched state, or may be monoaxially stretched, preferably biaxially oriented. When the multi-layer laminated film includes a polyamide resin layer [III], it is preferable to stretch the film to use. When the multi-layer laminated film includes an ethylene/vinyl alcohol copolymer layer [IV], the film may be used in either the unstretched state or the stretched state. The film strength can be increased by stretching, so that if the multi-layer laminated film is required to have high strength, the film is preferably stretched. In general, when a film is stretched, the adhesion strength of its adhesive layer is sharply decreased. However, the multi-layer laminated film of the invention does not suffer such sharp decrease of the adhesion strength and keeps adhesion strength enough for the practical use, even if the film is stretched. Stretching of the film of the invention is desirably carried out at least monoaxially in a stretch ratio of 1.5 to 6 times. In the case of biaxial stretching (orientation), the film is preferably oriented biaxially in a stretch ratio of 1.5 to 6 times.

In the preparation of the multi-layer laminated film serving as a shrink film, the stretching (orientation) is generally carried out under the conditions of a stretching temperature of 70 to 130° C. and a stretch ratio (lengthwise×crosswise) of 2×2 to 5×5 times. The film prepared under such conditions has a thickness of 10 to 200 μm. The film can be shrinkable between 70 to 130° C., from 5% to 50% of the length or width.

Effect of the Invention

The adhesive polyethylene composition of the invention shows excellent adhesion strength to ethylene polymers, polyamide resins and ethylene/vinyl alcohol copolymers, and high heat sealing strength and heat resistance.

The multi-layer laminated film of the invention shows excellent adhesion strength in any of the unstretched and stretched states, and besides it has excellent strength, heat resistance, gas barrier properties and heat shrinkability.

Accordingly, the multi-layer laminated film of the invention can be suitably used as a shrink film for packaging foods and meat such as ham.

EXAMPLE

The present invention will be further described with reference to the following examples, but it should be construed that the invention is in no way limited to those examples.

Example 1

Preparation of Modified Ethylene/1-butene Copolymer Resin (MAH-PE-1)

In a Henschel mixer, 100 parts by weight of an ethylene/1-butene copolymer resin (abbreviated to "PE-1", density: 0.920 g/cm$^3$, melting point (Tm): 124° C., crystallinity: 48%, MFR (ASTM D 1238, 190° C., load of 2.16 kg): 2.0 g/10 min, ethylene content: 96% by mol) prepared by the use of a Ti catalyst, 0.8 part by weight of maleic anhydride and 0.07 part by weight of peroxide (trade name: Perhexine-25B, available from NOF Corporation) were mixed. The resulting mixture was subjected to melt graft modification by means of a single-screw extruder (diameter: 65 mmφ) preset at 230° C., to obtain a modified ethylene/1-butene copolymer resin (abbreviated to "MAH-PE-1").

Measurement of the graft quantity of the maleic anhydride in the modified ethylene/1-butene copolymer resin (MAH-PE-1) by IR analysis resulted in 0.8% by weight. This copolymer resin had MFR (190° C., load of 2.16 kg) of 0.27 g/10 min and a melting point of 122° C.

Preparation of Modified Polyethylene Composition (1)

10 Parts by weight of the modified ethylene/1-butene copolymer resin (MAH-PE-1) thus obtained, 30 parts by weight of an unmodified ethylene/1-butene copolymer resin (PE-1), 30 parts by weight of an ethylene/propylene copolymer rubber (abbreviated to "EPR", density: 0.865 g/cm$^3$, MFR (190° C., load of 2.16 kg): 2.9 g/10 min, ethylene content: 80% by mol) prepared by the use of a V catalyst, 25 parts by weight of an ethylene/1-butene copolymer rubber (abbreviated to "EBR", density: 0.885 g/cm$^3$, MFR (ASTM D 1238, 190° C., load of 2.16 kg) : 3.6 g/10 min, ethylene content: 90% by mol) prepared by the use of a V catalyst, 5 parts by weight of a tackifier (trade name: Alkon P125, available from Arakawa Chemical Industries, Ltd.), 0.05 part by weight of Irganox 1010 (trade name, stabilizer, available from Ciba Geigy Japan, Ltd.), 0.10 part by weight of Irgafos 168 (trade name, stabilizer, available from Ciba Geigy Japan, Ltd.) and 0.03 part by weight of synthetic hydrotalcite (trade name: DHT-4A, stabilizer, available from Kyowa Chemical K.K.) were mixed. The resulting mixture was melt kneaded by a single-screw extruder to obtain a modified polyethylene composition (1).

The composition (1) had a density of 0.904 g/cm$^3$, MFR (ASTM D 1238, 190° C., load of 2.16 kg) of 2.0 g/10 min, a maleic anhydride graft quantity of 0.08% by weight and a crystallinity of 35%.

Using the composition (1), a multi-layer oriented film was prepared. Then, the film was evaluated on the adhesion strength to an ethylene/vinyl alcohol copolymer (EVOH), heat-sealing strength and heat resistance in accordance with the following test methods.

(I) Test of adhesion strength to ethylene/vinyl alcohol copolymer

An ethylene/vinyl alcohol copolymer (EVOH, trade name: Eval EP-E105, available from Kuraray Co., Ltd., MFR (ASTM D 1238, 190° C., load of 2.165 kg) : 5.5 g/10 min, ethylene content: 44% by mol), the modified polyethylene composition (1) and an unmodified ethylene/1-butene copolymer resin (PE-1) were co-extruded into a three-layer cast film under the following conditions.

Molding conditions

Layer structure and thickness of each layer:

EVOH (external layer)/composition (1) (intermediate layer)/PE-1 (internal layer)=40/40/160 μm Molding machine:

Extruder with die 40 mmφ in diameter (for external layer) preset temperature: 220° C.

Extruder with die 40 mmφ in diameter (for intermediate layer)

preset temperature: 220° C.

Extruder with die 40 mmφ in diameter (for internal layer) preset temperature: 220° C.

Molding speed: 5 m/min

The three-layer film obtained above was heated at 80° C. for 10 minutes and then stretched at this temperature in a stretch ratio of 3 times in the lengthwise direction and in a stretch ratio of 3 times in the crosswise direction at the same time by means of a biaxial orientation machine manufactured by Toyo Seiki Seisakusho K.K. Thus, a three-layer oriented film was produced.

After the three-layer oriented film was cooled to room temperature, the interlaminar strength (peel strength) between the EVOH layer and the composition layer of the film was measured by a T-peel test at a peel rate of 300 mm/min.

(II) Heat-sealing strength test

Two of the three-layer oriented films were heat sealed by means of a heat sealer TP-701B, manufactured by Tester Sangyo K.K.) under the following conditions. Then, the adhesion strength was measured in the same manner as in the above-mentioned T-peel test.

Heat sealing conditions

Temperature: 140° C.

Heat-sealing pressure: 2 kg/cm$^2$

Heat-sealing time: 1 second (III) Heat resistance test

A wooden rectangular parallelepiped (10 cm×10 cm×2 cm) was interposed between two of the biaxially oriented films (square films, side length: 15 cm), and the four sides of the films were heat sealed under the above conditions.

Then, the heat sealed films were immersed in hot water at 90° C. for 10 minutes to shrink the films, and occurrence of break of the films was observed.

The results of the tests are set forth in Table 1.

Examples 2 and 3

Modified polyethylene compositions (2) and (3) were obtained in the same manner as in Example 1, except that the MAH-PE-1, PE-1, EPR, EBR and the tackifier were used in the amounts shown in Table 1.

The density, MFR (ASTM D 1238, 190° C., load of 2.16 kg), the graft quantity of the maleic anhydride and the crystallinity of each composition are set forth in Table 1.

Using the compositions, three-layer oriented films were prepared in the same manner as in Example 1. Then, the resulting films were subjected to the aforesaid tests.

The results are set forth in Table 1.

Examples 4 and 5

Modified polyethylene compositions (4) and (5) were obtained in the same manner as in Example 1, except that an ethylene/1-octene copolymer rubber (abbreviated to "EOR", density: 0.870 g/cm$^3$, MFR (ASTM D 1238, 190° C., load of 2.16 kg): 5.8 g/10 min, ethylene content: 85% by mol) prepared by the use of a Zr catalyst was used in the amount shown in Table 1 in place of the EBR, and a tackifier "Eskorez 5320" (trade name, available from Tonex Co.) was used in the amount shown in Table 1 in place of the tackifier "Alkon P125" (trade name, available from Arakawa Chemical Industries, Ltd.).

The density, MFR (ASTM D 1238, 190° C., load of 2.16 kg), the graft quantity of the maleic anhydride and the crystallinity of each composition are set forth in Table 1.

Using the compositions, three-layer oriented films were prepared in the same manner as in Example 1. Then, the resulting films were subjected to the aforesaid tests.

The results are set forth in Table 1.

Examples 6 and 7

Preparation of Modified Ethylene/1-butene Copolymer Elastomer (MAH-PE-2)

In a Henschel mixer, 100 parts by weight of the EBR of Example 1 (density: 0.885 g/cm$^3$, MFR (ASTM D 1238, 190° C., load of 2.16 kg): 3.6 g/10 min, ethylene content:

90% by mol, melting point (Tm): 72° C., crystallinity: 16%) prepared by the use of a V catalyst, 0.5 part by weight of maleic anhydride and 0.045 part by weight of peroxide (trade name: Perhexine-25B, available from NOF Corporation) were mixed. The resulting mixture was subjected to melt graft modification by means of a single-screw extruder (diameter: 65 mmφ) preset at 230° C., to obtain a modified ethylene/1-butene copolymer elastomer (abbreviated to "MAH-PE-2").

Measurement of the graft quantity of the maleic anhydride in the modified ethylene/1-butene copolymer elastomer (MAH-PE-2) by IR analysis resulted in 0.5% by weight. This copolymer elastomer had MFR (ASTM D 1238, 190° C., load of 2.16 kg) of 2.1 g/10 min and a melting point of 71° C.

Preparation of Modified Polyethylene Compositions (6) and (7)

Modified polyethylene compositions (6) and (7) were obtained in the same manner as in Example 1, except that the MAH-PE-2, PE-1, EPR and the tackifier Eskorez 5320 were used in the amounts shown in Table 1.

The density, MFR (ASTM D 1238, 190° C., load of 2.16 kg), the graft quantity of the maleic anhydride and the crystallinity of each composition are set forth in Table 1.

Using the compositions, three-layer oriented films were prepared in the same manner as in Example 1. Then, the resulting films were subjected to the aforesaid tests.

The results are set forth in Table 1.

Example 8

A modified polyethylene composition (8) was obtained in the same manner as in Example 7, except that an ethylene/1-hexene copolymer resin (abbreviated to "PE-2", density: 0.923 g/cm³, MFR (ASTM D 1238, 190° C., load of 2.16 kg): 2.1 g/10 min) prepared by the use of a Zr catalyst was used in the amount shown in Table 1 in place of the PE-1.

The density, MFR (ASTM D 1238, 190° C., load of 2.16 kg), the graft quantity of the maleic anhydride and the crystallinity of the composition (8) are set forth in Table 1.

Using the composition (8), a three-layer oriented film was prepared in the same manner as in Example 1. Then, the resulting film was subjected to the aforesaid tests.

The results are set forth in Table 1.

Comparative Example 1

Preparation of Modified high-density Polyethylene Resin (MAH-PE-3)

A high-density polyethylene (abbreviated to "HDPE", density: 0.965 g/cm³, MFR (ASTM D 1238, 190° C., load of 2.16 kg): 15 g/10 min, melting point (Tm): 132° C., crystallinity: 75%) prepared by the use of a Ti catalyst was grafted with maleic anhydride in a toluene solvent by a solution modification method, to obtain a modified high-density polyethylene resin (abbreviated to "MAH-PE-3").

The graft quantity of the maleic anhydride in the modified high-density polyethylene resin (MAH-PE-3) was 2.2% by weight. This resin had MFR (ASTM D 1238, 190° C., load of 2.16 kg) of 4.2 g/10 min and a melting point of 127° C.

Preparation of Modified Polyethylene Composition (9)

A modified polyethylene composition (9) was obtained in the same manner as in Example 1, except that the components and the amounts were varied so that the resulting composition (9) consisted of 5 parts by weight of the modified high-density polyethylene resin (MAH-PE-3), 65 parts by weight of the unmodified ethylene/1-butene copolymer resin (PE-1) and 30 parts by weight of the unmodified EPR.

The density, MFR (ASTM D 1238, 190° C., load of 2.16 kg), the graft quantity of the maleic anhydride and the crystallinity of the composition (9) are set forth in Table 1.

Using the composition (9), a three-layer oriented film was prepared in the same manner as in Example 1. Then, the resulting film was subjected to the aforesaid tests.

The interlaminar strength between the layer of the modified polyethylene composition (9) and the ethylene/vinyl alcohol copolymer layer and the heat-sealing strength were both low and insufficient.

The results are set forth in Table 1.

Comparative Example 2

A modified polyethylene composition (10) was obtained in the same manner as in Example 1, except that the amount of the modified ethylene/1-butene copolymer resin (MAH-PE-1) was varied to 15 parts by weight, and 85 parts by weight of an unmodified medium-density polyethylene resin (abbreviated to "PE-3", density: 0.940 g/cm³, MFR (ASTM D 1238, 190° C., load of 2.16 kg): 2.2 g/10 min, crystallinity: 60%) was used in place of 65 parts by weight of the unmodified ethylene/1-butene copolymer resin (PE-1), and none of the EPR, EBR and tackifier were used.

The density, MFR (ASTM D 1238, 190° C., load of 2.16 kg), the graft quantity of the maleic anhydride and the crystallinity of the composition (10) are set forth in Table 1.

Using the composition (10), a three-layer oriented film was prepared in the same manner as in Example 1. Then, the resulting film was subjected to the aforesaid tests.

The composition (10) had a high density of 0.938 g/cm³ and a high crystallinity of 59%, so that the interlaminar strength between the layer of the modified polyethylene composition (10) and the ethylene/vinyl alcohol copolymer layer and the heat-sealing strength were both low and insufficient.

The results are set forth in Table 1.

Comparative Example 3

A modified polyethylene composition (11) was obtained in the same manner as in Example 1, except that 30 parts by weight of the modified ethylene/1-butene copolymer elastomer (MAH-PE-2) of Example 6 was used in place of 10 parts by weight of the modified ethylene/1-butene copolymer resin (MAH-PE-1), and the amount of the EPR was varied to 70 parts by weight, and none of the PE-1, EBR and tackifier were used.

The density, MFR (ASTM D 1238, 190° C., load of 2.16 kg), the graft quantity of the maleic anhydride and the crystallinity of the compostion (11) are set forth in Table 1.

Using the composition (11), a three-layer oriented film was prepared in the same manner as in Example 1. Then, the resulting film was subjected to the aforesaid tests.

The composition (11) had a density of 0.870 g/cm³ and a crystallinity of 13%, and they were too low. Therefore, the heat resistance of the film was so bad that break of the film took place, though the interlaminar strength between the layer of the modified polyethylene composition (11) and the ethylene/vinyl alcohol copolymer layer and the heat-sealing strength were good.

The results are set forth in Table 1.

Comparative Example 4

A modified polyethylene composition (12) was obtained in the same manner as in Example 1, except that the amount of the modified ethylene/1-butene copolymer resin (MAH-PE-1) and the amount of the unmodified PE-1 were varied to 15 parts by weight and 55 parts by weight, respectively, and none of the EBR and tackifier were used.

The density, MFR (ASTM D 1238, 190° C., load of 2.16 kg), the graft quantity of the maleic anhydride and the crystallinity of the compostion (12) are set forth in Table 1.

Using the composition (12), a three-layer oriented film was prepared in the same manner as in Example 1. Then, the resulting film was subjected to the aforesaid tests.

The results are set forth in Table 1.

Comparative Example 5

In a Henschel mixer, 70 parts by weight of the PE-1 used in Example 1, 30 parts by weight of the EPR used in Example 6, 0.2 part by weight of maleic anhydride and 0.01 part by weight of peroxide (trade name: Perhexine-25B, available from NOF Corporation) were mixed. The resulting mixture was subjected to melt graft modification by means of an extruder (diameter: 65 mmφ) preset at 230° C., to obtain a modified polyethylene mixture (abbreviated to "MAH-PE-4").

Measurement of the graft quantity of the maleic anhydride in the modified product by IR analysis resulted in 0.2% by weight. This modified product had MFR (190° C., load of 2.165 kg) of 1.2 g/10 min and a melting point of 122° C.

In a Henschel mixer, 95 parts by weight of the above modified product, 5 parts by weight of Eskorez 5320, 0.05 part by weight of Irganox 1010 (trade name, stabilizer, available from Ciba Geigy Japan, Ltd.), 0.10 part by weight of Irgafos 168 (trade name, stabilizer, available from Ciba Geigy Japan, Ltd.) and 0.03 part by weight of synthetic hydrotalcite (trade name: DHT-4A, stabilizer, available from Kyowa Kagaku K.K.) were mixed. The resulting mixture was melt blended by an extruder (diameter: 65 mmφ) preset at 200° C., to obtain a modified polyethylene resin composition (13). Measurement of the graft quantity of the maleic anhydride in this composition by IR analysis resulted in 0.2% by weight. The composition had MFR (190° C., load of 2.165 kg) of 1.3 g/10 min, a density of 0.903 g/cm$^3$ and a crystallinity of 35%.

Using the composition (13), a three-layer oriented film was prepared in the same manner as in Example 1. Then, the resulting film was subjected to the aforesaid tests.

The results are set forth in Table 1.

TABLE 1

|  | Example | | | | | | | | Comparative Example | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Components (part by weight) | | | | | | | | | | | | | |
| Modified ethylene/α-olefin copolymer | | | | | | | | | | | | | |
| MAH-PE-1 (resin) | 10 | 15 | 20 | 15 | 15 | — | — | — | — | 15 | — | 15 | — |
| MAH-PE-2 (elastomer) | — | — | — | — | — | 30 | 40 | 40 | — | — | 30 | — | — |
| MAH-PE-3 (resin) | — | — | — | — | — | — | — | — | 5 | — | — | — | — |
| MAH-PE-4 (resin + elastomer | — | — | — | — | — | — | — | — | — | — | — | — | 95 |
| Unmodified ethylene/α-olefin copolymer resin | | | | | | | | | | | | | |
| PE-1 | 30 | 25 | 20 | 50 | 30 | 40 | 40 | — | 65 | — | — | 55 | — |
| PE-2 | — | — | — | — | — | — | — | 40 | — | — | — | — | — |
| PE-3 | — | — | — | — | — | — | — | — | — | 85 | — | — | — |
| Unmodified ethylene/a-olefin copolymer elastomer | | | | | | | | | | | | | |
| EPR | 30 | 30 | 30 | 15 | 20 | 25 | 15 | 15 | 30 | — | 70 | 30 | — |
| EBR | 25 | 25 | 25 | — | — | — | — | — | — | — | — | — | — |
| EOR | — | — | — | 15 | 25 | — | — | — | — | — | — | — | — |
| Tackifier | | | | | | | | | | | | | |
| Alkon P125 (trade name) | 5 | 5 | 5 | — | — | — | — | — | — | — | — | — | — |
| Eskorez 5320 (trade name) | — | — | — | 5 | 10 | 5 | 5 | 5 | — | — | — | — | 5 |
| Properties of composition | | | | | | | | | | | | | |
| Density (g/cm$^3$) | 0.904 | 0.903 | 0.904 | 0.914 | 0.908 | 0.904 | 0.907 | 0.907 | 0.908 | 0.938 | 0.870 | 0.910 | 0.904 |
| MFR (g/10 min) | 2.0 | 1.8 | 1.7 | 1.8 | 1.9 | 2.2 | 2.0 | 2.1 | 2.3 | 1.6 | 2.6 | 1.6 | 2.1 |
| Graft quantity (% by wt.) | 0.08 | 0.12 | 0.16 | 0.12 | 0.12 | 0.15 | 0.20 | 0.20 | 0.11 | 0.12 | 0.15 | 0.12 | 0.08 |
| Crystallinity (%) | 35 | 34 | 35 | 43 | 39 | 35 | 38 | 38 | 39 | 59 | 13 | 40 | 35 |
| Properties of oriented film | | | | | | | | | | | | | |
| Interlaminer strength between composition layer and EVOH layer (g/15 mm) | 105 | 125 | 115 | 130 | 125 | 130 | 140 | 130 | 38 | 54 | 150 | 90 | 50 |

TABLE 1-continued

|  | Example | | | | | | | | Comparative Example | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Heat-sealing strength (g/15 mm) | 2200 | 2100 | 2400 | 2300 | 2200 | 2100 | 2300 | 2200 | 1500 | 1600 | 2200 | 2100 | 1600 |
| Heat resistance | AA | AA | AA | AA | AA | AA | AA | AA | AA | AA | BB | AA | AA |

Remarks
Heat resistance AA: Film was not broken
BB: Film was broken.
MAH-PE-1: modified product of PE-1, MAH-PE-2: modified product of EBR, MAH-PE-3: modified product of HDPE,
MAH-PE-4: modified product of a mixture of PE-1 and an ethylene/1-butene copolymer rubber.

What is claimed is:

1. A multi-layer laminated film which is a laminate of 3 or more layers comprising an ethylene polymer layer (I) comprising an ethylene polymer having an ethylene content of not less than 70% by mol, an adhesive layer (II) comprising an adhesive polyethylene composition, and either of a polyamide resin layer (III), an ethylene/vinyl alcohol copolymer layer (IV) or a layer (V) of a mixture of a polyamide resin and an ethylene/vinyl alcohol copolymer, superposed in this order, wherein said adhesive polyethylene composition consists essentially of:

a modified ethylene/α-olefin copolymer resin (A2) or a modified ethylene/α-olefin copolymer elastomer (B2), wherein the modified resin or modified elastomer is obtained by modifying an unmodified ethylene/α-olefin copolymer resin (A1) or an unmodified ethylene/α-olefin copolymer elastomer (B1) with an unsaturated carboxylic acid or anhydride, ester, amide, imide or metallic salt derivative thereof and having a graft quantity of 0.01 to 5% by weight, each of said resin (A1) and said elastomer (B1) being a copolymer of ethylene and an α-olefin of 3 to 20 carbon atoms and having the following properties:

(i) the density is in the range of 0.860 to 0.930 g/cm$^3$, and
(ii) the crystallinity, as measured by X-ray diffractometry, is not more than 60%;

an unmodified ethylene/α-olefin copolymer resin (C1) and/or an unmodified ethylene/α-olefin copolymer elastomer (C2); and a tackifier (D), and wherein the adhesive polyethylene composition has the following properties:

(a) the content of the tackifier (D) is in the range of 0.1 to 20% by weight based on 100% by weight of the whole composition;
(b) the graft quantity of the unsaturated carboxylic acid or derivative thereof is in the range of 0.01 to 1.0% by weight based on 100% by weight of the whole composition;
(c) the density is in the range of 0.880 to 0.920 g/cm$^3$;
(d) the crystallinity, as measured by X-ray diffractometry, is in the range of 15 to 50%; and
(e) the melt flow rate, measured at 190° C., load of 2.16 kg is in the range of 0.1 to 50 g/10 min.

2. The multi-layer laminated film as claimed in claim 1, wherein the ethylene polymer is a low-density polyethylene or an ethylene/vinyl acetate copolymer.

3. The multi-layer laminated film as claimed in claim 1, wherein said film is at least monoaxially stretched.

4. The multi-layer laminated film as claimed in claim 3, wherein said film is at least monoaxially stretched in a stretch ratio of 1.5 to 6 times.

5. The multi-layer laminated film as claimed in claim 1, wherein said film is biaxially oriented.

6. The multi-layer laminated film as claimed in claim 5, wherein said film is biaxially oriented in a stretch ratio of 1.5 to 6 times in each axial direction.

7. The multi-layer laminated film as claimed in claim 1, wherein the ethylene/α-olefin copolymer elastomer (B1) is a copolymer of ethylene and an α-olefin of 3 to 20 carbon atoms and has the following properties:

(i) the density is in the range of 0.860 to 0.900 g/cm$^3$; and
(ii) the crystallinity, as measured by X-ray diffractometry is less than 30%.

8. The multi-layer laminated film as claimed in claim 1, wherein the ethylene/α-olefin copolymer resin (C1) is a copolymer of ethylene and an α-olefin of 3 to 20 carbon atoms and has the following properties:

(i) the density is more than 0.900 g/cm$^3$ and not more than 0.930 g/cm$^3$;
(ii) the temperature (melting point, Tm) giving the maximum peak of an endotherm curve of said copolymer resin measured by a differential scanning calorimeter (DSC) is not higher than 125° C. and not lower than 100° C.; and
(iii) the crystallinity, as measured by X-ray diffractometry, is not more than 60%.

9. A biaxially oriented multi-layer laminated shrink film which is oriented in a stretch ratio of 1.5 to 6 times in each axial direction and which is a laminate of 3 or more layers consisting essentially of an ethylene polymer layer (I) comprising an ethylene polymer having an ethylene content of not less than 70% by mol, an adhesive layer (II) consisting essentially of adhesive polyethylene composition, and either of a polyamide resin layer (III), an ethylene/vinyl alcohol copolymer layer (IV) or a layer (V) of a mixture of a polyamide resin and an ethylene/vinyl alcohol copolymer, superposed in this order, wherein said adhesive polyethylene composition consists essentially of:

a modified ethylene/α-olefin copolymer resin (A2) wherein the modified resin is obtained by modifying an unmodified ethylene/α-olefin copolymer resin (A1) with an unsaturated carboxylic acid or anhydride, ester, amide, imide or metallic salt derivative thereof and having a graft quantity of 0.01 to 5% by weight, said resin (A1) being a copolymer of ethylene and an α-olefin of 3 to 20 carbon atoms and having the following properties:

(i) the density is in the range of 0.860 to 0.930 g/cm$^3$, and (ii) the crystallinity, as measured by X-ray diffractometry, is not more than 60%;

an unmodified ethylene/α-olefin copolymer resin (C1) and/or an unmodified ethylene/α-olefin copolymer elastomer (C2) and a tackifier (D), and wherein the adhesive polyethylene composition has the following properties:

(a) the content of the tackifier (D) is in the range of 0.1 to 20% by weight based on 100% by weight of the whole composition;

(b) the graft quantity of the unsaturated carboxylic acid or derivative thereof is in the range of 0.01 to 1.0% by weight based on 100% by weight of the whole composition;

(c) the density is in the range of 0.880 to 0.920 g/cm$^3$;

(d) the crystallinity, as measured by X-ray diffractometry, is in the range of 15 to 50%; and (e) the melt flow rate, measured at 190° C., load of 2.16 kg is in the range of 0.1 to 50 g/10 min.

10. The multi-layer laminated film as claimed in claim 9, wherein the ethylene/α-olefin copolymer resin (C1) is a copolymer of ethylene and an α-olefin of 3 to 20 carbon atoms and has the following properties:

(i) the density is more than 0.900 g/cm$^3$ and not more than 0.930 g/cm$^3$;

(ii) the temperature (melting point, Tm) giving the maximum peak of an endotherm curve of said copolymer resin measured by a differential scanning calorimeter (DSC) is not higher than 125° C. and not lower than 100° C.; and (iii) the crystallinity, as measured by X-ray diffractometry, is not more than 60%.

11. A biaxially oriented multi-layer laminated shrink film which is oriented in a stretch ratio of 1.5 to 6 times in each axial direction and which is a laminate of 3 or more layers consisting essentially of an ethylene polymer layer (I) comprising an ethylene polymer having an ethylene content of not less than 70% by mol, an adhesive layer (II) consisting essentially of an adhesive polyethylene composition, and either of a polyamide resin layer (III), an ethylene/vinyl alcohol copolymer layer (IV) or a layer (V) of a mixture of a polyamide resin and an ethylene/vinyl alcohol copolymer, superposed in this order, wherein said adhesive polyethylene composition consists essentially of:

a modified ethylene/α-olefin copolymer elastomer (B2), wherein the modified elastomer is obtained by modifying an unmodified ethylene/α-olefin copolymer elastomer (B1) with an unsaturated carboxylic acid or anhydride, ester, amide, imide or metallic salt derivative thereof and having a graft quantity of 0.1 to 5% by weight, said elastomer (B1) being a copolymer of ethylene and an α-olefin of 3 to 20 carbon atoms and having the following properties:

(i) the density is in the range of 0.860 to 0.930 g/cm$^3$, and (ii) the crystallinity, as measured by X-ray diffractometry, is not more than 60%;

an unmodified ethylene/α-olefin copolymer resin (C1) and/or an unmodified ethylene/α-olefin copolymer elastomer (C2); and a tackifier (D), and wherein the adhesive polyethylene composition has the following properties:

(a) the content of the tackifier (D) is in the range of 0.1 to 20% by weight based on 100% by weight of the whole composition;

(b) the graft quantity of the unsaturated carboxylic acid or derivative thereof is in the range of 0.01 to 1.0% by weight based on 100% by weight of the whole composition;

(c) the density is in the range of 0.880 to 0.920 g/cm$^3$;

(d) the crystallinity, as measured by X-ray diffractometry, is in the range of 15 to 50%; and (e) the melt flow rate, measured at 190° C., load of 2.16 kg is in the range of 0.1 to 50 g/10 min.

12. The multi-layer laminated film as claimed in claim 11, wherein the ethylene/α-olefin copolymer elastomer (B1) is a copolymer of ethylene and an α-olefin of 3 to 20 carbon atoms and has the following properties:

(i) the density is in the range of 0.860 to 0.900 g/cm$^3$; and (ii) the crystallinity, as measured by X-ray diffractometry is less than 30%.

13. The multi-layer laminated film as claimed in claim 12, wherein the ethylene/α-olefin copolymer resin (C1) is a copolymer of ethylene and an α-olefin copolymer resin (C1) is a copolymer of ethylene and an α-olefin of 3 to 20 carbon atoms and has the following properties:

(i) the density is more than 0.900 g/cm$^3$ and not more than 0.930 g/cm$^3$;

(ii) the temperature (melting point, Tm) giving the maximum peak of an endotherm curve of said copolymer resin measured by a differential scanning calorimeter (DSC) is not higher than 125° C. and not lower than 100° C.; and (iii) the crystallinity, as measured by X-ray diffractometry, is not more than 60%.

* * * * *